United States Patent

[11] 3,630,291

| [72] | Inventors | George E. Womble<br>Kewanee;<br>Lorrin H. Schwartz, Kankakee, both of Ill. |
|---|---|---|
| [21] | Appl. No. | 47,339 |
| [22] | Filed | June 18, 1970 |
| [45] | Patented | Dec. 28, 1971 |
| [73] | Assignee | Kewanee Machinery & Conveyor Co.<br>Kewanee, Ill. |

[54] DISC HARROW
8 Claims, 8 Drawing Figs.

[52] U.S. Cl. ........................................ 172/581,
172/582, 172/593, 172/595
[51] Int. Cl. ........................................ A01b 7/00,
A01b 21/08
[50] Field of Search............................. 172/569,
574–576, 581, 582, 584, 591, 593–600, 644–645,
654, 666

[56] References Cited
UNITED STATES PATENTS

| 2,787,105 | 4/1957 | Witwer.......................... | 172/581 |
| 2,800,757 | 7/1957 | Tufford........................ | 172/595 |
| 2,897,905 | 8/1959 | McCleskey.................... | 172/593 |
| 3,480,085 | 11/1969 | Tilbury et al. ................ | 172/581 |
| 3,502,155 | 4/1970 | Kenney ........................ | 172/591 |

Primary Examiner—Robert E. Pulfrey
Assistant Examiner—C. W. Hanor
Attorney—Johnson, Dienner, Emrich, Verbeck and Wagner ABSTRACT: A disc harrow including a generally rectangular frame structure having front and rear pairs of disc gangs supported thereon, the front disc gangs having intermediate portions supported for longitudinal sliding movement and inner ends connected to a common connecting pin movable longitudinally of the frame structure, the rear disc gangs including intermediate portions pivotally connected to the frame structure adjacent the rearward corners thereof and inner end portions having elongated slots receiving a common connecting pin movable longitudinally of the harrow, and adjustment means associated with each of the connecting pins for selective movement thereof to vary the angular relationship between the disc gangs and the longitudinal axis of the harrow.

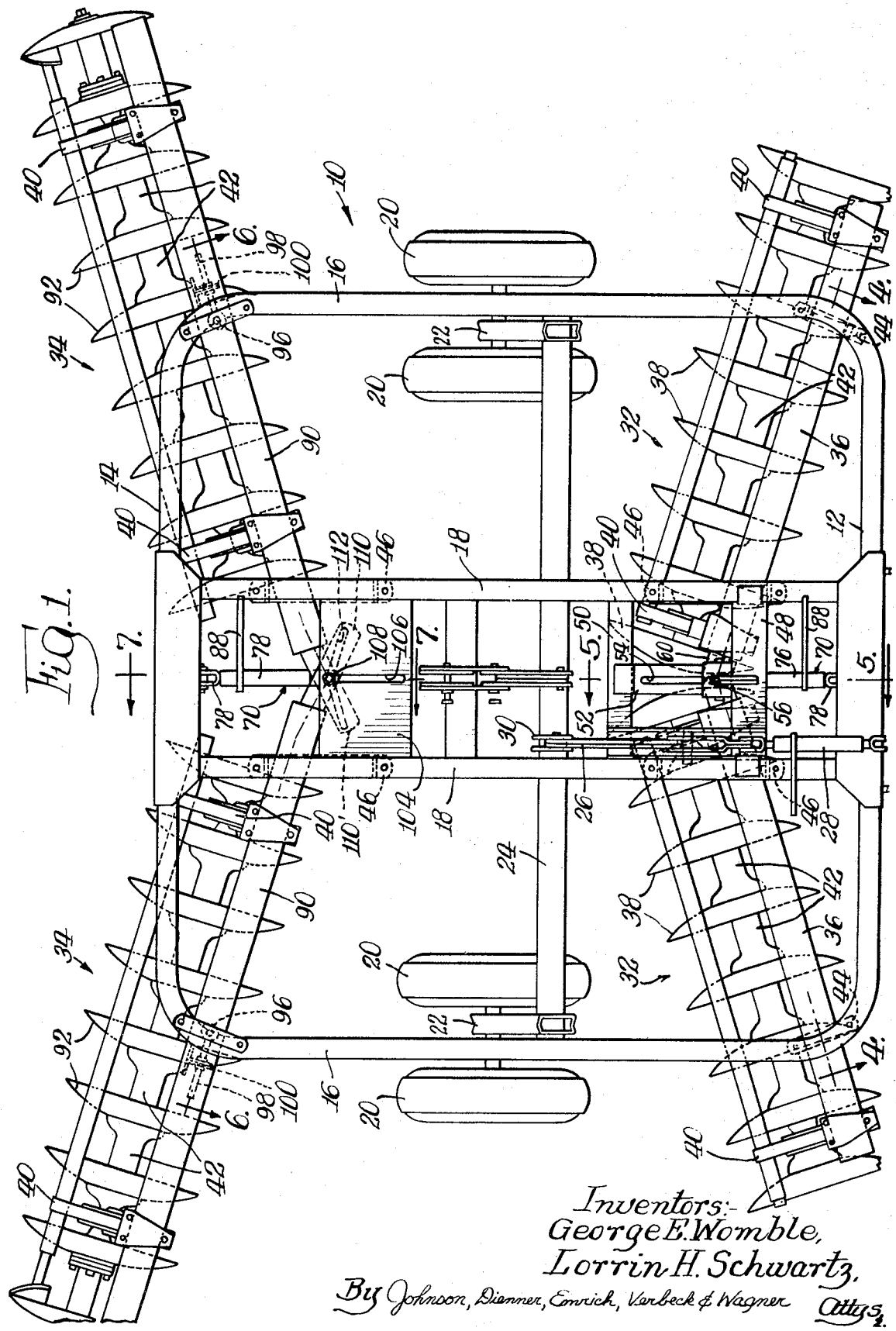

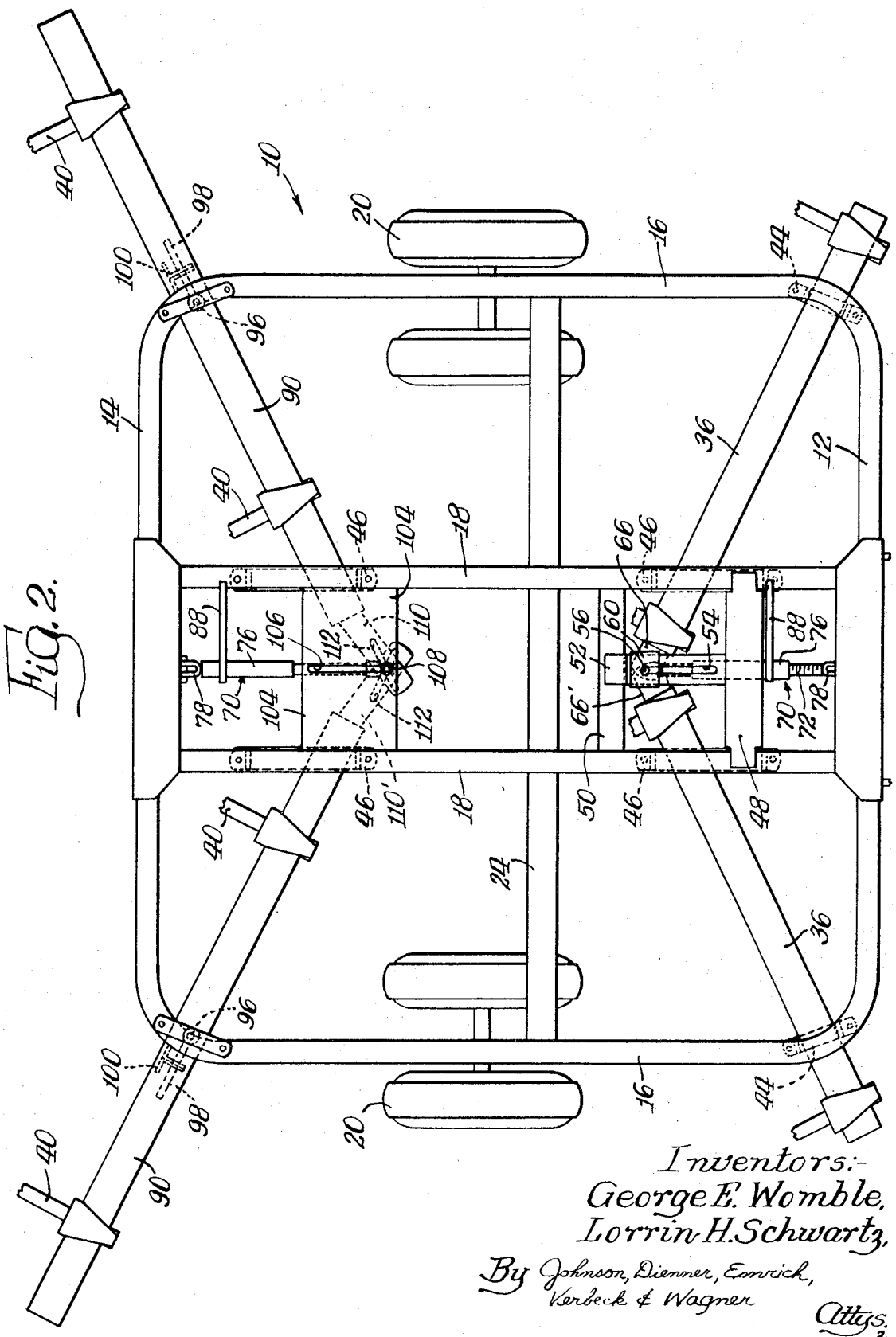

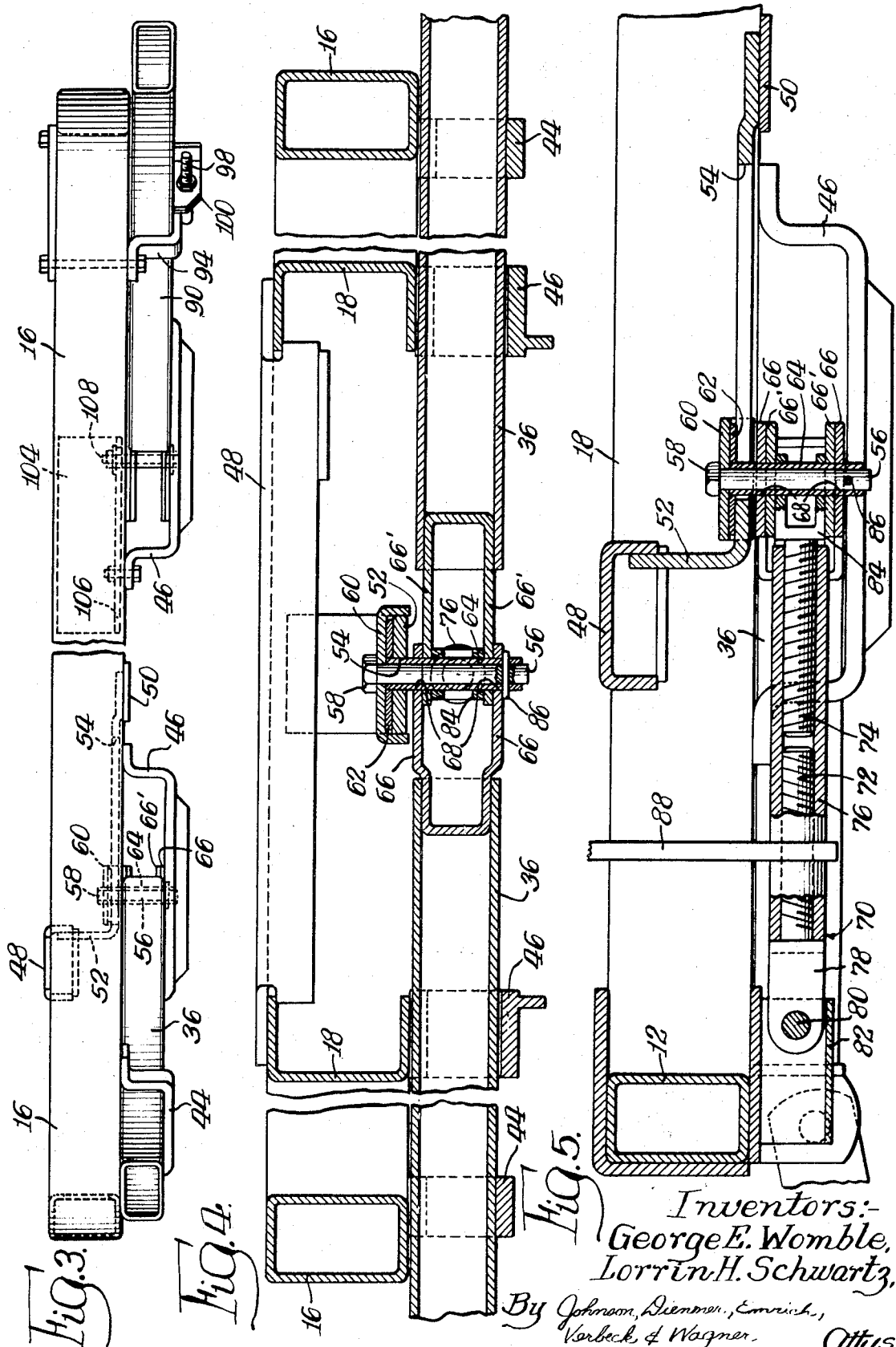

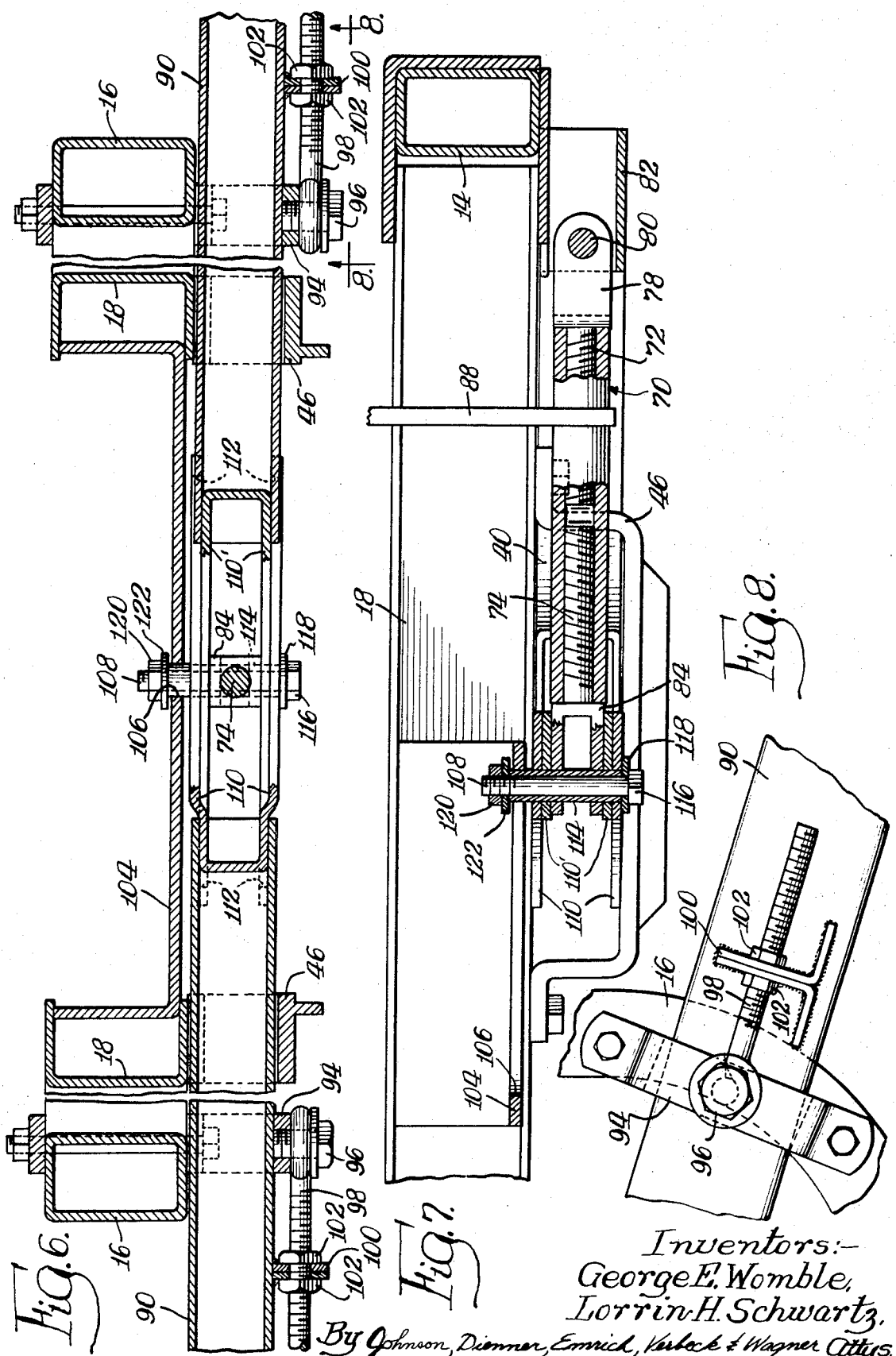

DISC HARROW

BACKGROUND OF THE INVENTION

The present invention relates generally to disc harrows, and more particularly to a disc harrow having forward and rear pairs of disc gangs supported in a novel manner to provide more efficient ground cultivation.

Disc harrows having forward and rear pairs of disc gangs which are angularly adjustable relative to the longitudinal axis of the harrow for varying the cultivation pattern are generally known. These disc harrows employ generally concave-shaped disc blades which, during operation of the harrow, serve to produce furrows in the ground. By varying the angular relationship between the respective pairs of forward and rear disc gangs, the ground area disced and the width and depth of each furrow can be controlled. Many disc harrows support the forward disc gangs such that the concave surfaces of the blades are directed outwardly from the longitudinal axis of the harrow with a resulting movement of dirt in a direction outwardly from the longitudinal axis of the harrow during discing. The rear disc gangs are supported such that the concave surfaces of the discs are directed inwardly toward the longitudinal axis of the harrow with a resulting movement of dirt toward the center of the harrow during discing. If the innermost opposing disc blades on the forward pair of disc gangs are not sufficiently close together, an undisced center ridge will be left in the ground being cultivated. Conversely, if the innermost opposing disc blades on the rear disc gangs are spaced too closely together, an undesirable amount of dirt will be thrown toward the center of the harrow creating a ridge centrally rearwardly of the harrow during discing. The present invention provides novel means for mounting the forward and rear pairs of disc gangs to substantially reduce the extent of any undisced area between the forward pair of disc gangs, and to minimize the tendency of the rear discs gangs to create a ridge centrally rearwardly of the harrow during discing.

SUMMARY OF THE INVENTION

One of the primary objects of the present invention is to provide a disc harrow having forward and rear pairs of disc gangs mounted in a novel manner to minimize undisced ground area between the forward pair of disc gangs, and to minimize the tendency of the rear pair of disc gangs to create a ridge therebetween during operation of the harrow.

Another object of the present invention is to provide a disc harrow wherein intermediate portions of the forward disc gang beams are supported for longitudinal sliding movement with the inner end portions of the forward beams being interconnected through a common connecting pin adjustable longitudinally of the harrow to vary the angular relation between the front disc gangs, and wherein intermediate portions of the rear disc gang beams are pivotally connected to the frame structure with the inner ends of the rearward beams being interconnected through a common connecting pin received within elongated slots in the associated inner ends of the rear beams and movable longitudinally of the harrow to vary the angular relationship between the rear disc gangs.

In carrying out the objects and advantages of the present invention, we provide a disc harrow having a generally rectangular frame structure including spaced side frame members and a longitudinally extending frame portion disposed intermediate the side frames. A pair of forward disc gangs are supported by the frame with intermediate portions of the forward disc beams being supported for longitudinal sliding movement. The inner ends of the forward disc beams are interconnected through a common connecting pin supported for movement longitudinally of the central frame portion. A pair of rearward disc gangs are supported by the frame with intermediate portions of the rear disc beams being pivotally connected to the laterally spaced side frame members and with inner end portions of the beams having elongated slots adapted to receive a common connecting pin supported by the central frame member for movement in a longitudinal direction. Adjustment screws are supported by the frame structure and operatively associated with each of the forward and rearward connecting pins, the adjustment screws being manually adjustable to change the included angular relation between the associated pairs of forward and rearward disc gangs. In this fashion, the innermost disc blades of the front disc gangs may be spaced closer together, particularly at extreme operating angles relative to the transverse axis of the frame structure, resulting in a smaller undisced center ridge during operation. Correspondingly, by preventing onward longitudinal movement of the rear disc gangs during angular adjustment thereof, the amount of dirt moved toward the center of the harrow is minimized thereby substantially reducing the ridge that would otherwise be created centrally of the rear disc gangs.

Further objects, features and advantages of the present invention will become apparent from the following description of a preferred embodiment when taken in conjunction with the accompanying drawing, in which like reference numerals designate like parts throughout the several views.

BRIEF DESCRIPTION OF THE DRAWINGS

FIG. 1 is a partial top plan view of a disc harrow constructed in accordance with the present invention;

FIG. 2 is a top view generally similar to FIG. 1 but diagrammatically illustrating the forward and rear pairs of disc gang beams in their extreme operating angles of adjustment;

FIG. 3 is a foreshortened partial side elevational view, taken partly in section, illustrating a forward and a rearward disc gang beam supported by the frame structure;

FIG. 4 is a foreshortened sectional view, taken generally along the line 4—4 of FIG. 1, illustrating the forward pair of disc gang beams with their inner ends connected through a common connecting pin;

FIG. 5 is a partial longitudinal sectional view taken generally along the line 5—5 of FIG. 1, looking in the direction of the arrows;

FIG. 6 is a foreshortened sectional view taken substantially along the line 6—6 of FIG. 1 through the longitudinal axes of the rear disc gang beams, looking in the direction of the arrows;

FIG. 7 is a partial longitudinal sectional view taken generally along the line 7—7 of FIG. 1, looking in the direction of the arrows, and illustrates the rearward adjustment jack connection to the rear disc gang beams; and FIG. 8 is a view taken along the line 8—8 of FIG. 6, looking in the direction of the arrows, and illustrates the adjustable pivotal connection of one of the rear disc gang beams to the associated frame structure.

DESCRIPTION OF A PREFERRED EMBODIMENT

Referring now to the drawings, and in particular to FIGS. 1 and 2, the present invention is illustrated in conjunction with a disc harrow indicated generally at reference numeral 10. The disc harrow 10 includes a generally rectangular frame structure having forward and rearward transverse frame members 12 and 14, respectively, and parallel-spaced side frame members 16 formed integral with or otherwise suitably secured in normal relation to the transverse frame members 12 and 14. The frame structure also includes an intermediate frame portion comprising parallel spaced channels 18 extending longitudinally of the harrow generally centrally between the side frame members 16 and parallel thereto, the opposite end portions of the channels 18 being suitably secured to the transverse frame members 12 and 14 in any suitable manner.

Wheel means comprising laterally spaced pairs of wheels 20 are supported on trailing axle arms 22 which are fixedly secured to a transverse pivot shaft 24. The pivot shaft 24 is pivotally supported through bearing means (not shown) in a known manner. An actuating lever 26 is pivotally connected at one end to a bell crank lever and a manually adjustable frame leveling ratchet jack 28, and at its other end to a pair of spaced arms 30 fixedly secured to the pivot shaft 24 such that actuation of the leveling jack 28 will effect leveling of the frame structure and disc gangs as is known. Conventional coupling means are secured to the forward transverse frame member 12 for connecting the disc harrow to a tractor or the like for moving the disc harrow along the ground in a direction parallel to the central frame channels 18.

The present invention is directed to the manner and means for adjustably mounting forward and rear pairs of disc gangs on the frame structure of the disc harrow 10 to maximize the area disced by the forward disc gangs and minimize the tendency of the rear disc gangs to create a ridge centrally of the rear disc gangs during operation. To this end, the disc harrow 10 includes a forward pair of disc gangs, each of which is indicated generally at 32, and a rear pair of disc gangs, each of which is indicated generally at 34. Each of the forward disc gangs 32 includes a rigid elongated beam 36 adapted to support a plurality of concave disc blades 38. The disc blades 38 are rotatably supported on a support shaft which is secured in parallel relation to the associated beam 36 by standards or hangers 40 as described and illustrated in copending application, SER. No. 7,614 filed Feb. 2, 1970, and assigned to the assignee of the present invention. The disc blades 38 are supported such that their concave surfaces are directed outwardly from the longitudinal axis of the harrow and are maintained in longitudinally spaced relation along the associated support shaft through spools 42 in a known manner.

Noting FIGS. 1 and 2, taken in conjunction with FIGS. 3-5, each of the disc gangs beams 36 has its intermediate length portion supported within a generally U-shaped strap member 44 fixedly secured to the lower surface of the corresponding side frame member 16 generally adjacent the intersection of the side frame member and the transverse cross frame member 12 such that the forward beams are movable lengthwise within the associated guide straps 44 in directions generally transverse to the side frame members 16. As will become more apparent hereinbelow, the U-shaped straps 44 allow both lengthwise sliding movement of the associated beams 36 therethrough and movement of the associated beams in horizontal planes. An elongated generally U-shaped strap 46 is suitably secured to the lower surface of each of the channels 18 spaced rearwardly from the forward cross frame member 12 and defines an elongated slot with the lower surface of the corresponding channel 18. The elongated slots defined by the straps 46 and the lower surface of the associated channels 18 receive the inner ends of the beams 36 therethrough in a manner to allow both lengthwise and generally crosswise sliding of the beams within the support straps 46.

A pair of parallel crossmembers 48 and 50 are secured, respectively, to the upper and lower surfaces of the longitudinally extending channels 18 in spaced relation rearwardly from the forward crossframe member 12. A generally L-shaped guide strap 52 is secured to the crossmembers 48 and 50 centrally thereof guide as to extend along the opposing axis of the disc harrow. The horizontal portion of the guide strap 52 has an elongated slot 54 therethrough which serves as a guide track for a generally vertically disposed connecting pin 56. The connecting pin 56 has a head portion 58 which engages the upper surface of an inverted U-shaped guide member 60 having depending leg portions which engage the parallel edge surfaces of the guide strap 52 while allowing sliding movement of the guide member along the guide strap. A spacer 62 may be provided between the upper surface of the guide strap 52 and the lower opposing surface of the guide member 60, both the guide member and the spacer having suitable openings therethrough to receive the shank portion of the connecting pin 56. A tubular sleeve 64 is received over the shank of the connecting pin 56 with the upper peripheral surface of the sleeve engaging the elongated edge surfaces defining the guide slot 54.

Each of the disc gang beams 36 has a pair of axially extending parallel spaced arms secured to the innermost end thereof, the pairs of arms being indicated at 66 and 66'. The parallel spaced arms 66 and 66' may be formed integral with the associated tubular beam 36 or may comprise leg portions of U-shaped members received within the innermost end of the associated beam such that the leg portions extend outwardly in axial directions. The arms 66 are spaced vertically apart a slightly greater distance than the spaced arms 66' to receive the arms 66' therebetween as illustrated in FIGS. 4 and 5. Each of the pairs of parallel arms 66 and 66' has aligned openings 68 adapted to slidably receive the connecting pin 56 and sleeve 64 therethrough. In this manner, it can be seen that movement of the vertically disposed connecting pin 56 longitudinally of the disc harrow 10 within the guide slot 54 will effect both lengthwise movement of the associated disc gang beams 36 and angular movement thereof in a horizontal plane to vary the included angle between the pair of front disc gangs 32.

The disc harrow 10 includes means associated with the forward connecting pin 56 for effecting selective longitudinal movement thereof, which means comprises a ratchet or angling jack indicated generally at 70. Noting FIG. 5, the angling jacket 70 includes a pair of axially aligned oppositely threaded screw shafts 72 and 74 received within a tubular adjustment rod 76 having a uniformly unidirectional threaded bore to cooperatively threadedly receive the screw shafts. The screw shaft 72 is secured to a clevis connector 78 which is pivotally secured on a cross-shaft 80 of an anchor mounting 82 affixed to the lower surface of the forward cross frame member 12. The screw shaft 74 has a clevis connector 84 secured thereto which has axially aligned openings to slidably receive the tubular sleeve 64 and connecting pin 56 therethrough. In assembly, when the connecting pin 56 and sleeve 64 are inserted through the spacer 62, slot 54 of guide strap 52, arms 66 and 66' of the beams 36, and the clevis 84, a cross pin 86 is inserted through a cross bore in the sleeve and connecting pin to maintain the assembled elements in fixed longitudinal relation on the connecting pin. An operating handle 88 is operatively associated with the adjustment rod 76 through conventional two-way ratchet means such that angular movement of the operating handle about the axis of the adjustment rod 76 will effect rotational movement of the connecting rod in a selected direction to effect axial inward or outward movement of the associated screw shafts 72 and 74 in a conventional manner. In this fashion, it can be seen that the angling jack 70 provides a means for selectively manually moving the connecting pin 56 longitudinally of the disc harrow to effect inward or outward lengthwise movement of the disc gang beams 36 and an angular adjustment of the beams about the disc harrow. By connecting the innermost adjacent ends of the disc gang beams 36 through the common connecting pin 56, the innermost opposed disc blades 38 may be brought closer together during all angular movements of the forward pair of gang discs than can be obtained in the prior art disc harrows, thus substantially reducing the extent of undisced ground between the forward disc gangs during operation of the disc harrow.

With reference to FIGS. 1-3, taken in conjunction with FIGS. 6-8, the rear pair of disc gangs 34 each includes an elongated rigid support beam 90 having a disc rectangular cross-sectional configuration similar to the forward disc beams 36. Each of the rear beams 90 supports a plurality of disc blades 92 in longitudinally spaced relation along a support shaft which is secured to the associated beam 90 through standards or hangers 40 similar to the standards supporting the forward disc blades 38. The disc blades 92 are maintained in longitudinally spaced relation along their associated support shafts by spools 42 and have concave configurations similar to the forward discs 38, the rear disc blades 92 having their concave surfaces facing inwardly toward the longitudinal axis of the disc harrow. The intermediate lengths of the rear disc beams 90 are received through generally U-shaped strap members 94 which are secured to the lower surfaces of the outer side frame members 16 adjacent the rear transverse frame member 14 and allow movement of the associated beams in a generally horizontal plane.

Each of the beams 90 is maintained in generally fixed longitudinal relation within its associated strap member 94 for pivotal movement about a fixed pivot axis defined by a headed stub shaft 96 suitably secured to the lower horizontal portion of the associated guide strap member 94. An eyebolt 98 is retained on each of the stub shafts 96 between the headed portion thereof and the associated strap member 94 so as to be rotatable about the stub shaft. Each eyebolt has an elongated threaded portion received through an appropriate opening in a depending bracket arm 100 affixed in normal relation to the lowermost horizontal surface of the associated disc beam 90. A pair of lock nuts 102 are threadedly received on the outer threaded end portion of each of the eyebolts 98 on opposite sides of the associated depending bracket arm 100, and are adjustable on the eyebolt to effect inward and outward movement of the associated beam 90 relative to its guide strap 94 in a direction generally transverse to the corresponding side frame member 16.

The inner end portions of the rear disc beams 90 are slidably received through longitudinally extending elongated U-shaped guide straps 46 secured to the lower surfaces of the spaced frame channels 18 longitudinally forwardly from the rear cross frame member 14. The rear guide straps 46 cooperate with the outer rear strap members 94 to maintain the beams 90 in generally horizontal planes, the elongated rear guide straps 46 allowing limited pivotal movement of the beams 90 about their respective pivot axes 96. A cross plate 104 is secured to and between the parallel frame channels 18 such that the horizontal planar portion of the cross plate is generally coplanar with the lower surfaces of the channels 18. The cross plate 104 has an elongated guide slot 106 therein which extends longitudinally centrally of the disc harrow and slidingly receives a generally vertically disposed connecting pin 108 for guiding relation therewith.

Each of the rear disc gang beams 90 has a pair of parallel vertically spaced arms, indicated at 110 and 110', which extend generally axially of the inner ends of the associated beams. The arms 110 and 110' may be formed integrally with the beams 90 or may comprise parallel-spaced arms of generally U-shaped bracket members which are received within the inner end portions of the beams and are fixedly retained therein. The arm 110 are spaced sufficiently to receive the arm 110' therebetween, with each of the spaced arms having an elongated slot 112 therethrough. The slots 112 of each pair of spaced arms 110 and 110' are vertically aligned, as considered in FIG. 6, and are adapted to receive the connecting pin 108 therethrough. The minor axis dimension of the slots 112 is such that the slots slidingly receive a sleeve 114 disposed about the connecting pin 108. The connecting pin 108 has a head portion 116 abutting a washer 118 which engages the lower surface of the lowermost arm 110 of the associated disc beam 190, the upper end of the connecting pin having a lock nut 120 thereon abutting a washer 122 which engages the upper surface of the cross plate 104. In assembly, the lock nut 120 and washer 122 are brought into engagement with the upper end of the sleeve 106 to maintain the connecting pin 108 in suspended vertical relation relative to the cross plate 104 and support the inner arms 110 and 110' of the beams 90 in generally horizontal relation.

The connecting pin 108 is movable longitudinally of the disc harrow within the guide slot 106 in similar fashion to the movement of the above-described connecting pin 56 associated with the front disc beams 36. To this end, a rachet or angling jack 70, identical to that described above, has a rear clevis connector 78 pivotally connected to a cross pin 80 in an anchor mounting 82 secured to the lower surface of the rear cross frame member 14, a clevis connector 84 having axially aligned holes therethrough to receive the sleeve 114 on the connecting pin 108, and an operating handle 84 mounted on the adjustment rod 76 through reversible rachet means to allow axial extension or retraction of the screw shafts 72 and 74 with a corresponding movement of the connecting pin 108 within its guide slot 106.

At noted above, in disc harrows having pairs of rear disc gangs which utilize concave-shaped disc blades supported such that the concave surfaces face inwardly toward the longitudinal axis of the disc harrow, earth being disced is moved toward the center of the harrow. Moreover, in conventional discing operations it is desirable to provide means for changing the angular relationship of the rear pair of disc gangs relative to the longitudinal axis of the harrow and to combine such angular movement of the rear disc gangs with angular movement of the forward disc gangs to achieve the desired discing pattern without creating undesirable ridges or furrows centrally of the disc harrow. As the included angle between the rear disc gangs is decreased, or stated alternatively, when the rear disc beams are adjusted to increase the angular relation between the axis of the beams relative to a plane disposed transversely of the longitudinal axis of the harrow, the rear disc blades, and particularly the innermost opposed disc blades, tend to move a greater amount of earth toward the center of the harrow. The known disc harrows allow the rear disc gangs to move longitudinally inwardly as the included angle between the disc gangs is decreased. This action allows the innermost disc blades to move closer together due to both the change in angular relation of the rear disc gangs and the inward longitudinal movement of the rear disc gangs, with a resulting increase in the size of earthen ridge created. By preventing inward longitudinal movement of the rear disc beams 90 through their fixed pivotal connections to the outer guide straps 94, the present invention substantially eliminates the undesirable buildup of an earthen ridge centrally rearwardly of the disc harrow during operation.

The present invention thus provides a disc harrow having angularly adjustable pairs of forward and rear disc gangs. The forward disc gangs are angularly adjustable to vary the included angle between the pair of forward disc gangs in a manner to allow close spacing of the innermost disc blades whereby to minimize the extent of undisced ground. The rear disc gangs are angularly adjustable to vary the included angle therebetween but are prevented from inward lengthwise movement relative to the side frame members such that the innermost disc blades are maintained in the desired lateral spaced relation to substantially eliminate the buildup of an undesirable ridge or furrow centrally rearwardly of the disc harrow during a discing operation.

While a preferred embodiment of the present invention has been described and illustrated, it will be obvious to those skilled in the art that changes and modifications may be made therein without departing from the invention in its broader aspects.

We claim:

1. A disc harrow comprising, in combination, a generally rectangular frame structure including spaced side frame members and a frame portion disposed intermediate said side frame members, pairs of front and rear disc gangs operatively associated with said frame structure on generally opposite sides of said intermediate frame portion, said pairs of disc gangs having disc blades mounted thereon for engagement with the ground, a front connecting pin supported by said intermediate frame portion for movement longitudinally of said frame structure, said pair of front gang bars having inner end portions connected to said front connecting pin for movement therewith and having their intermediate length portions supported for lengthwise movement relative to said side frame members, a rear connecting pin supported by said intermediate frame portion for movement in a direction longitudinally of said frame structure, said rear pair of gang bars including inner end portions having elongated slots receiving said rear connecting pin therethrough for sliding movement within said slots, each of said rear disc gangs being pivotally secured along its length to one of said side frame members such that movement of said rear connecting pin effects a change in the angular relation of said rear disc gangs bars relative to the longitudinal axis of said frame structure but does not effect lengthwise movement of said rear disc gangs relative to said side frame member, and means for effecting selective movement of said forward and rear connecting pins.

2. A disc harrow as defined in claim 1 wherein each of said rear disc gangs is pivotally connected along its length to one of said side frame members through adjustable means for lengthwise adjustment of the rear gang bars relative to said side frame members.

3. A disc harrow as defined in claim 1 wherein said intermediate frame portion includes means defining guide tracks for said front and rear connecting pins, said guide track defining means allowing movement of said front and rear connecting pins only in a direction longitudinally of said frame structure.

4. A disc harrow as defined in claim 1 wherein said means for effecting selective movement of said forward and rear connecting pins includes angling jack means operatively associated with each of said front and rear connecting pins and adapted to effect selective movement of said connecting pins longitudinally of said frame structure.

5. A disc harrow as defined in claim 1 including wheel means supported by said frame structure and movable between first positions operative to engage the ground and lift the disc blades above the ground, and second positions allowing engagement of said disc blades with the ground.

6. A disc harrow as defined in claim 1 wherein said intermediate frame portion is disposed centrally between said side frame members and includes means supporting said front and rear connecting pins in generally normal relation to the plane of said frame structure.

7. A disc harrow as defined in claim 6 wherein said means for effecting movement of said front and rear connecting pins includes angling jack means operatively associated with each of said connecting pins.

8. A disc harrow as defined in claim 7 including adjustable means pivotally interconnecting each of said rear disc gangs to its associated side frame member, said adjustable means being adapted to effect lengthwise movement of said rear disc gangs relative to said frame members.

* * * * *